United States Patent [19]

Kolada

[11] Patent Number: 5,279,007
[45] Date of Patent: Jan. 18, 1994

[54] WEB PROTECTION SYSTEM FOR DOUBLE SINKS

[75] Inventor: Paul P. Kolada, Bexley, Ohio

[73] Assignee: American Standard Inc., New York, N.Y.

[21] Appl. No.: 976,639

[22] Filed: Nov. 16, 1992

Related U.S. Application Data

[62] Division of Ser. No. 687,653, Apr. 19, 1991, Pat. No. 5,181,285.

[51] Int. Cl.⁵ .......................... A47L 19/04; A47J 47/20
[52] U.S. Cl. ............................................ 4/639; 4/656; 220/694; 248/916; 210/249; 210/474; 210/477; 210/479
[58] Field of Search ................... 4/553, 554, 638, 639, 4/640, 654, 656, 657, 658; 220/23.2, 482, 694; 134/115 R; 15/260; 248/214, 916; 210/249, 464, 470, 471, 474, 476, 477, 482, 479; 99/411, 413

[56] References Cited

U.S. PATENT DOCUMENTS

| 160,540 | 3/1875 | Murdock | 4/656 |
| 981,448 | 1/1911 | Matthews | 15/260 X |
| 986,265 | 3/1911 | Boss | 4/656 X |
| 2,055,078 | 9/1936 | Heffernan et al. | 210/474 X |
| 3,638,799 | 2/1972 | Serowiecki | 210/474 X |
| 3,742,965 | 4/1973 | Hudziak | 134/115 R |
| 3,960,733 | 6/1976 | Van Dieren | 210/474 X |
| 5,087,006 | 2/1992 | Wrench | 248/214 |

Primary Examiner—Robert M. Fetsuga
Attorney, Agent, or Firm—Elaine B. Robinson; Ann M. Knab

[57] ABSTRACT

A web protection system for a sink having at least first and second sink basins separated by a partition wall with the partition wall having an upper horizontal surface. The system includes an elongated web protector having a U-shaped cross-section which fits over and protects the partition wall. A colander having a pocket to hang over the partition wall is also provided. The colander can be used with the web protector or a separate adapter to fit properly over the partition wall.

5 Claims, 3 Drawing Sheets

WEB PROTECTION SYSTEM FOR DOUBLE SINKS

This is a division of application Ser. No. 06/687,653, filed on Apr. 19, 1991, now U.S. Pat. No. 5,181,285.

BACKGROUND OF THE INVENTION

The present invention is directed generally to a web protection system for protecting the partition wall separating the sink basins in a double sink and, in particular, to a web protection system including a colander or silverware tray adapted to hang on the partition wall between two sink basins including a corresponding adapter and web protector for use in conjunction therewith.

Sinks, particularly kitchen sinks, may include two or more adjacent sink basins to provide flexibility an convenience when using the sink. Such sinks may include two or more sink basins of the same or different sizes for various purposes. One such common sink includes a first large sink basin and a second smaller sink basin separated by an upstanding partition wall. The partition wall includes an upper horizontal surface.

When such sinks are used and items are placed in one sink basin or the other, and items such as dishes, silverware and the like are transferred from one sink to the other, it often happens that the upper horizontal surface of the partition wall becomes scratched or otherwise marred. Such scratching will occur in sinks made of stainless steel, porcelain, plastics or other materials.

It is also desirable to hang various kitchen accessories from the partition wall such that drainage can occur directly into one of the sink basins or excess food materials can be readily disposed of in a disposal in one of the sink basins. Such accessories also tend to scratch the upper horizontal surface of the partition wall when they are hanging thereon.

Accordingly, it is desired to provide a web protection system for protecting the upper horizontal surface of a partition wall extending between sink basins in a sink having at least two sink basins.

SUMMARY OF THE INVENTION

Generally speaking, in accordance with the present invention, a web protection system for a sink having at least first and second sink basins separated by a partition wall, is provided. The partition wall includes an upper horizontal surface. The web protection system includes a colander such as a silverware drainage tray or the like having a bucket portion having an upper surface. A deck extends outwardly from the upper surface of the bucket portion and a flange extends downwardly from the deck at a predetermined distance from the bucket portion to define a pocket therebetween. The pocket is larger than the width of the upper horizontal surface of the partition wall. An adapter is sized to fit in the pocket of the colander to reduce the size of the pocket so that the pocket fits properly on the upper horizontal surface of the partition wall.

One form of the adapter includes an elongated body having a U-shaped cross-section which is adapted to be removably secured over the upper horizontal surface of the partition wall. The ends of such a web protector may be flared outwardly to accommodate the flared ends of the upper horizontal surface of the partition wall when necessary.

In a second form, the adapter is a smaller body having a tongue which mates in a groove provided on the inner surface of the flange of the colander. This adapter is utilized when the elongated web protector is not used. Such adapter fills the gap in the pocket of the colander when the pocket is placed over the upper horizontal surface of the partition wall.

Accordingly, it is an object of the present invention to provide a web protection system for protecting the partition wall extending between sink basins in a sink having at least two sink basins.

Another object of the present invention is to provide a web protector for protecting the upper horizontal surface of a partition wall separating two sink basins in a sink having at least two sink basins.

A further object of the present invention is to provide a web protection system including a colander adapted to hang on the partition wall having an adapter to permit the colander to fit snugly on the partition wall.

Still a further object of the present invention is to provide a web protection system to protect the upper horizontal surface of a partition wall separating two sink basins which is inexpensive to manufacture while decorative.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
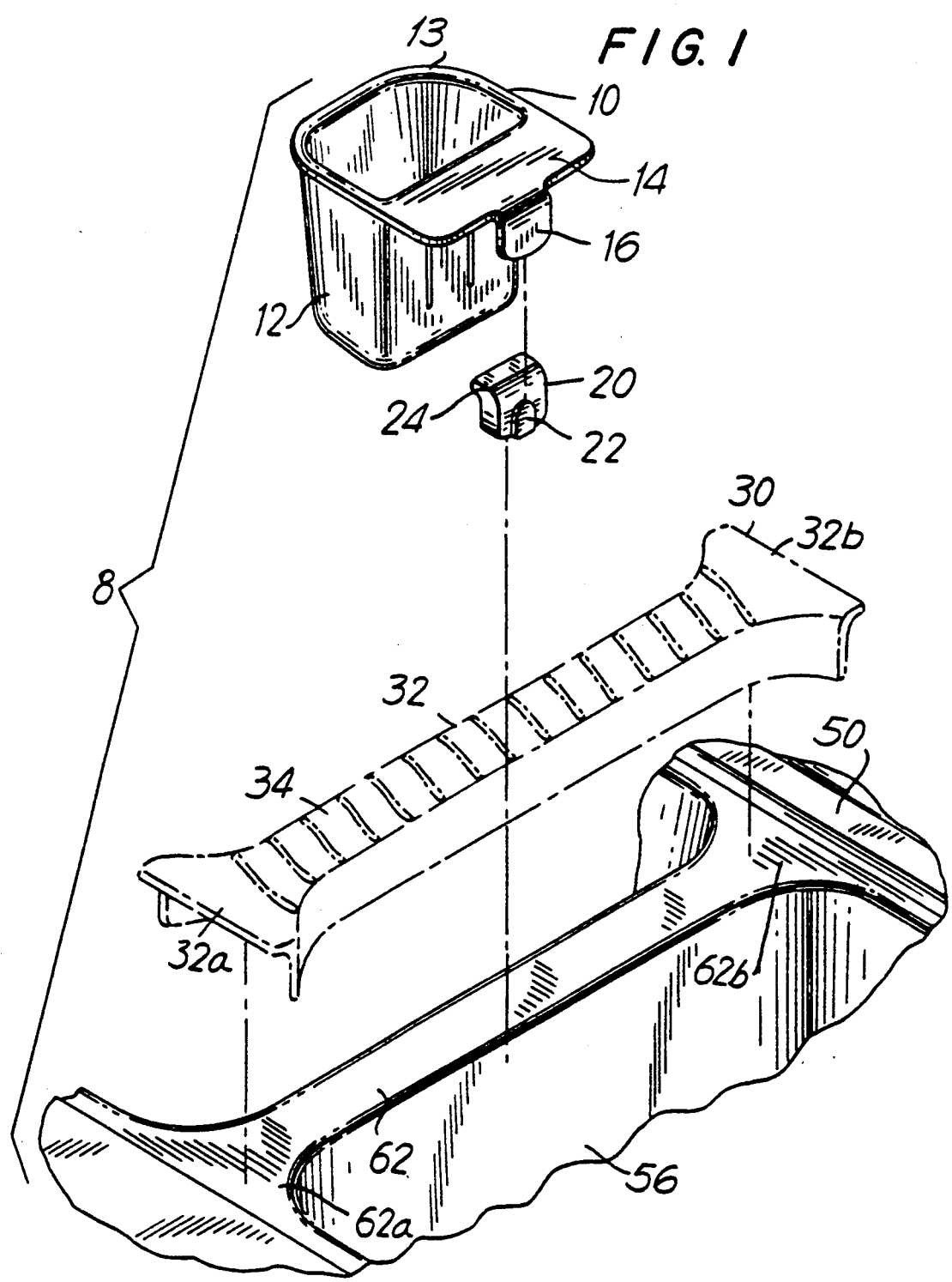
FIG. 1 is an exploded perspective view of a web protection system constructed in accordance with the present invention showing the two alternate adapters and the partition wall in a double sink.

Referring to the drawings, it is seen that the web protection system 8 of the present invention includes a colander 10 such as a silverware drainage tray or the like, a first adapter 20 and a second alternate adapter or web protector 30. The system is used in conjunction with a sink 50 having at least a first sink basin 52 and second sink basin 54 separated by a partition wall 56. Partition wall 56 separates first sink basin 52 from second sink basin 54 and includes opposing vertical side walls 58 and 60 and an upper horizontal surface 62.

Double sinks like sink 50 shown in the drawings provide great advantages and benefits to a user. For example, first sink basin 52 may be filled with water to wash dishes, silverware and the like while second sink basin 54 provides an area for rinsing the dishes after they are washed. In this regard, sink 50 may include a faucet 80 which swings between the two sink basins. Additionally, for example, while sink basin 52 is filled with dirty dishes, sink basin 54 is still available for use for various sink-related chores.

One of the problems with such sinks is that the upper horizontal surface 62 of partition wall 56 may become scratched or otherwise marred thereby detracting from the overall appearance and beauty of the sink. Such scratching and marring occurs regardless of whether the sink is made from stainless steel, porcelain, ceramics, plastics or other acceptable materials. As described below, the present invention provides a system for protecting the upper horizontal surface or web 62.

Figure 4:
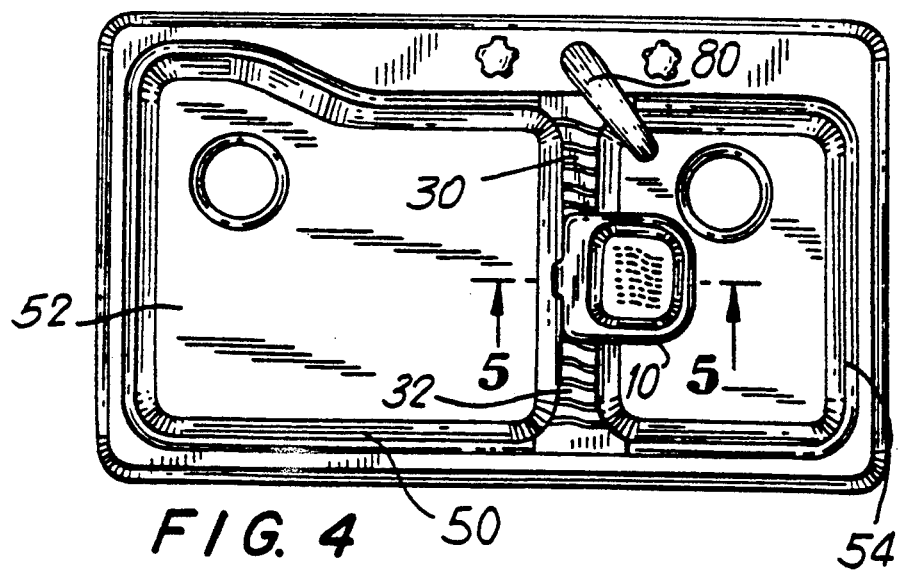
FIG. 4 is a top plan view similar to FIG. 2 but showing use of an alternate adapter or web protector of the web protection system of the present invention.
Figure 5:
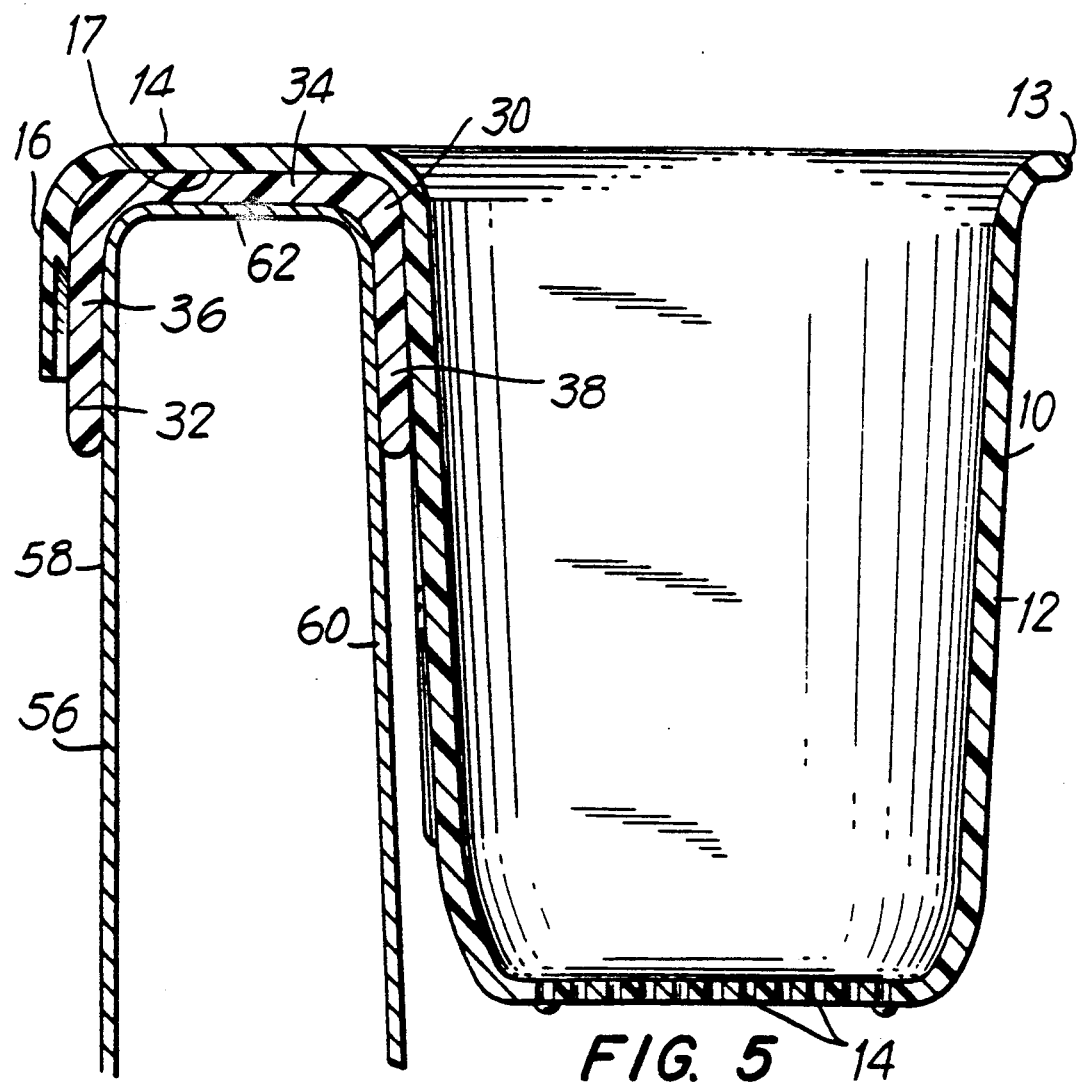
FIG. 5 is an enlarged sectional view taken along line 5—5 of FIG. 4.

As shown in phantom in FIG. 1 and more particularly in FIGS. 4 and 5, adapter or web protector 30 is provided. Web protector 30 is preferably molded from a plastic material and includes an elongated body 32 which is essentially U-shaped in cross-section. The length of body 32 corresponds essentially to the length of upper surface 62 of partition wall 56. U-shaped body 32 includes an upper horizontal surface 34 having downwardly depending legs 36 and 38. As best depicted in FIG. 5, when web protector 30 is in place over partition wall 56, leg 32 rests against wall 58 and leg 38 rests against wall 60. Similarly, horizontal surface 34 of web protector 30 rests against, covers and protects upper horizontal surface 62 of partition wall 56.

It is noted that the ends 32a and 32b of body 32 may be flared outwardly to correspond in shape to the flared ends 62a and 62b of upper horizontal surface 62 of partition wall 56.

When web protector 30 is in place on partition wall 56 as depicted, the upper surface thereof will be protected against scratching, marring and the like.

Colander 10, which may be a silverware drainage tray or food drainage tray, also preferably molded from plastic, includes a bucket portion 12 having holes 14 in the bottom thereof to permit water or other liquid to drain therethrough. Bucket portion 12 includes an upper surface or rim 13 having a deck 14 extending outwardly therefrom. A flange 16 extends downwardly from deck 14 to define a pocket 17 which is received on upper horizontal surface 62 of partition wall 56.

When adapter or web protector 30 is in place on partition wall 56 as depicted in FIGS. 4 and 5, the size of pocket 17 corresponds to the outer width of web protector 30 so that pocket 17 fits properly over web protector 30. Since web protector 30 is utilized in conjunction with colander 10 when colander 10 is hanging on partition wall 56, no scratching or marring will be caused by colander 10.

Figure 2:
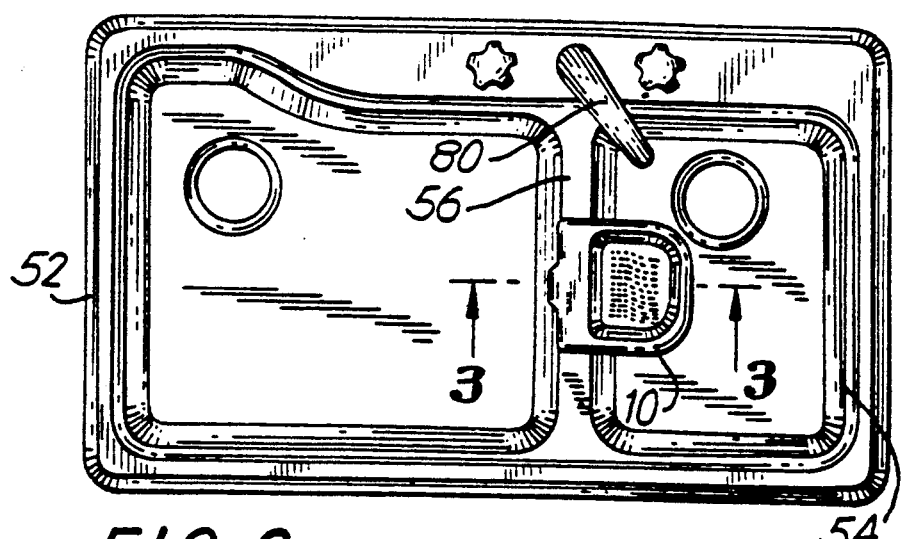
FIG. 2 is a top plan view of a double sink showing the use of the web protection system of the present invention.
Figure 3:
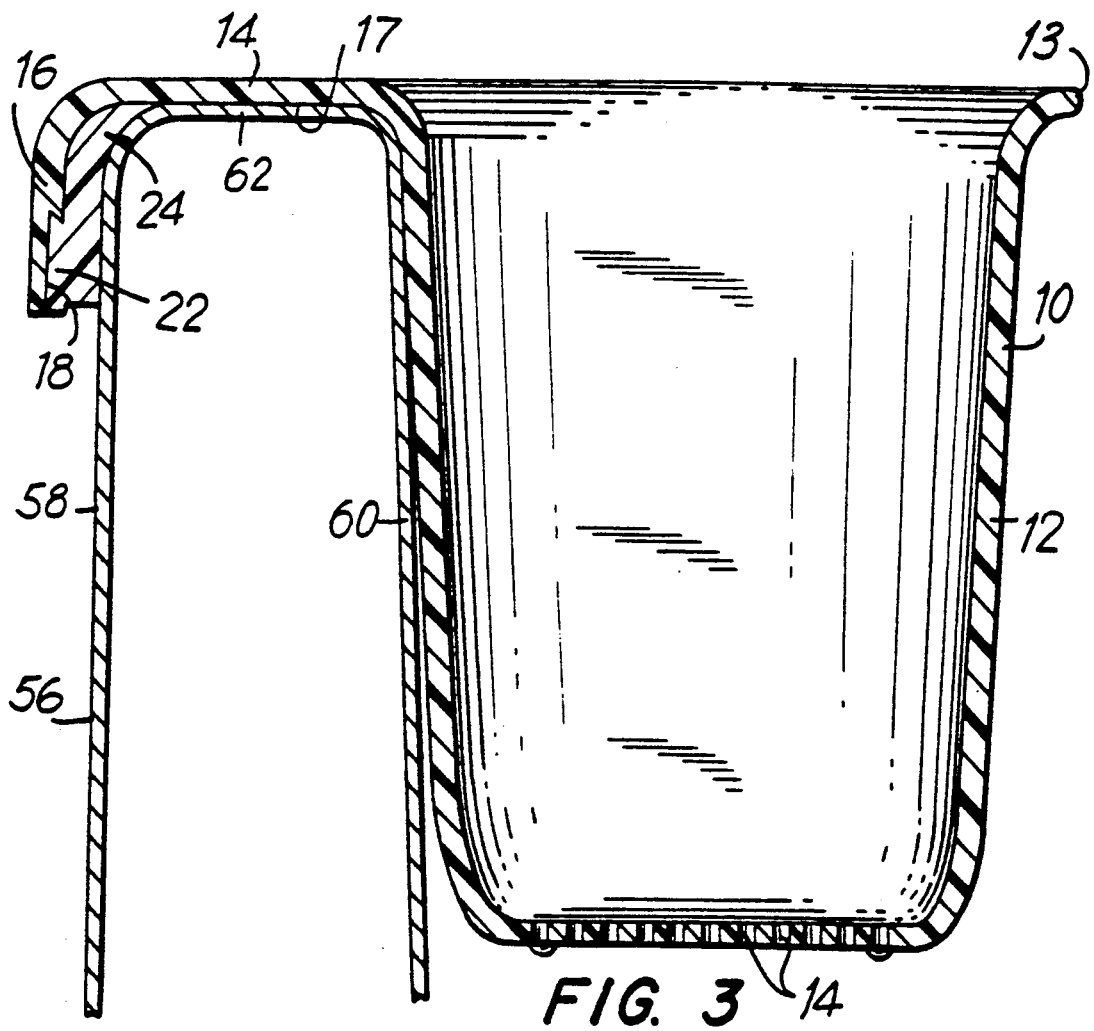
FIG. 3 is an enlarged sectional view taken along line 3—3 of FIG. 2.

When web protector 30 is not available or is not used, as best depicted in FIGS. 1, 2 and 3, a separate adapter 20 is utilized. Adapter 20, preferably molded from plastic, is sized to fill the gap in pocket 17 so that pocket 17 fits properly on partition wall 56. As depicted, adapter 20 is essentially the same size as flange 16 and includes a tongue 22 which is received in a corresponding groove 18 formed on the inside surface of flange 16 as best depicted in FIG. 3.

Hence, tongue 22 of adapter 20 is placed in groove 18 of flange 16 and then pocket 17 of colander 10 is placed over upper horizontal surface 62 of partition wall 56. Adapter 20 thus fills in the gap provided. It is noted that the upper portion 24 of adapter 20 may be curved inwardly to correspond to the curved surface of upper horizontal surface 62 of partition wall 56.

The present invention provides a flexible web protection system to protect the partition wall in a double sink or a sink having at least two sink basins separated by a partition wall. The elongated web protector provides absolute protection to the upper surface of the partition wall. When the elongated web protector is unavailable or not used, an adapter is provided for a colander which hangs on the upper surface of the partition wall. The web protection system of the present invention is relatively simple to manufacture and use while providing appropriate protection to the upper surface of the partition wall.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A web protector system for a sink having at least first and second sink basins separated by a partition wall and a predetermined thickness, said web protector 54 said partition wall having an upper horizontal surface and a predetermined thickness, said web protector system comprising a colander having a perforated bucket portion having an upper surface, a deck extending outwardly from said upper surface of said bucket portion, a flange extending downwardly from said deck at a predetermined distance from said bucket portion to define a pocket therebetween, said pocket having a lateral width sized to be larger than the thickness of said partition wall, and an adapter sized to fit in said pocket of said colander to reduce the width of said pocket so that said pocket fits snugly on said upper horizontal surface of said partition wall.

2. The web protection system as claimed in claim 1, wherein said flange includes a groove on its inner surface, said adapter including a tongue adapted to fit in said groove in said flange.

3. The web protection system as claimed in claim 2, wherein said adapter includes a curved portion.

4. The web protection system as claimed in claim 1, wherein said adapter is elongated and U-shaped in cross-section, said adapter being sized to fit over and rest on the upper horizontal surface of said partition wall, said pocket of said colander being sized to fit over and rest on said adapter.

5. The web protector system as claimed in claim 4, wherein said adapter includes opposing ends, said opposing ends being flared outwardly.

* * * * *